United States Patent
Takayama

(10) Patent No.: US 6,624,961 B1
(45) Date of Patent: Sep. 23, 2003

(54) TAPE DRIVE APPARATUS AND RECORDING MEDIUM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/372,088

(22) Filed: Aug. 11, 1999

(30) Foreign Application Priority Data

Aug. 14, 1998 (JP) .......................................... P10-229860

(51) Int. Cl.[7] .......................... G11B 15/18; G11B 15/46; G11B 15/48
(52) U.S. Cl. .................. 360/72.3; 360/72.1; 360/73.08; 360/74.5
(58) Field of Search .......................... 360/69, 132, 60, 360/73.04, 72.1, 71, 74.1, 74.5, 73.08, 72.3; 711/170

(56) References Cited

U.S. PATENT DOCUMENTS

| | | | | |
|---|---|---|---|---|
| 5,388,012 A | * | 2/1995 | Adams et al. | 360/48 |
| 5,602,686 A | * | 2/1997 | Shih | 360/48 |
| 5,852,534 A | * | 12/1998 | Ozue et al. | 360/69 |
| 6,043,948 A | | 3/2000 | Takayama | 360/69 |
| 6,101,070 A | * | 8/2000 | Oguro | 360/132 |
| 6,424,478 B2 | * | 7/2002 | Hamai et al. | 360/48 |

FOREIGN PATENT DOCUMENTS

| | | |
|---|---|---|
| EP | 0630022 | 12/1994 |
| EP | 0637025 | 2/1995 |
| JP | 9717703 | 5/1997 |

* cited by examiner

Primary Examiner—Andrew L. Sniezek
(74) Attorney, Agent, or Firm—Jay H. Maoli

(57) ABSTRACT

Formation of a partition is quickly performed. Management information areas such as a device area D1, system areas S1 and S2, an optional device area OD1, and the like are produced by writing necessary data, and with respect to a data area, a running amount of a magnetic tape corresponding to its capacity is calculated, and the magnetic tape is made to run by this running amount. Further, also with respect to a search and the like in the case where reproducing/recording is carried out from/to partitions formed in this way, a necessary running amount of the magnetic tape is calculated, and the magnetic tape is made to run by this running amount.

5 Claims, 18 Drawing Sheets

FIG. 9

| | | |
|---|---|---|
| MANUFACTURE PART | MANUFACTURE_PART_CHECKRUM | F11 |
| | MIC_TYPE | F12 |
| | MIC_MANUFACTURE_DATA | F13 |
| | MIC_MANUFACTURE_LINE_NAME | F14 |
| | MIC_MANUFACTURE_PLANT_NAME | F15 |
| | MIC_MANUFACTURE_NAME | F16 |
| | MIC_NAME | F17 |
| | CASSETTE_MANUFACTURE_DATA | F18 |
| | CASSETTE_MANUFACTURE_LINE_NAME | F19 |
| | CASSETTE_MANUFACTURE_PLANT_NAME | F20 |
| | CASSETTE_MANUFACTURER_NAME | F21 |
| | CASSETTE_NAME | F22 |
| | OEM_CUSTOMER_NAME | F23 |
| | RAWFORMAT ID | F24 |
| | MAXIMUM_CLOCK_FREQUENCY | F25 |
| | MAXIMUM_WRITE_CYCLE | F26 |
| | MIC_CAPACITY | F27 |
| | WRITE_PROTECT_TOP_ADDRESS | F28 |
| | WRITE_PROTECT_COUNT | F29 |
| | RESERVED | F30 |

FIG. 11 (A)

| | |
|---|---|
| EJECT STATUS | 20BYTES |
| REEL DIAMTER | 4BYTES |
| SET TO ZERO | 1BYTE |
| INITIALIZE COUNT | 3BYTES |
| VOLUME INFORMATION ON TAPE | 72BYTES |

FIG. 11 (B)

| | |
|---|---|
| SET TO ZERO | 4BYTES |
| SET TO ZERO | 2BYTES |
| SET TO ALL ZERO | 3BIT |
| SUPER HIGH SPEED SEARCH ENABLE FLAG | 1BIT |
| SYSTEM LOG ALLOCATION FLAGS | 2BIT |
| ALWAYS UNLOAD PBOT FLAG | 1BIT |
| DDS EMULATION FLAG | 1BIT |
| LAST VALID PARTITION NUMBER | 1BYTE |
| OPTIONAL DEVICE AREA ALLOCATION MAP (ARRAY [0 ··· 255] OF BIT) | 32BYTES |
| VALID PARTITION MAP ( 「0」 OR 「1」 ) | |
| SET TO ZERO | 32BYTES |

FIG. 12 (A)

| BIT BYTE | 7 | 6 | 5 | 4 | 3 | 2 | 1 | 0 |
|---|---|---|---|---|---|---|---|---|
| 0 | RESERVED | | | | PAGE CODE (31h) | | | |
| 1 | PAGE LENGTH (8) | | | | | | | |
| 2 | AIT | DEVICE | ABS | ULPBOT | RESERVED | | | |
| 3 | SPAN (0Ah) | | | | | | | |
| 4 | MIC | SKPFMT | RESERVED | | | | | SYS LOG ALIVE |
| 5 | RESERVED | | | | | | | |
| 6 | RESERVED | | | | | | | |
| 7 | RESERVED | | | | | | | |
| 8 | RESERVED | | | | | | | |
| 9 | RESERVED | | | | | | | |

FIG. 12 (B)

| BITS | CONTENTS |
|---|---|
| AIT | 0: NORMAL MODE (DDS)<br>1: MULTI-PARTITION MODE (AIT) |
| DEVICE | 0: OPTIONAL DEVICE AREA IS NOT FORMED<br>1: OPTIONAL DEVICE AREA IS FORMED |
| ABS | 0: ABSOLUTE VOLUME MAP INFORMATION IS NOT FORMED<br>1: ABSOLUTE VOLUME MAP INFORMATION IS FORMED |
| ULPBOT | 0: LOADING UNLOADING CAN BE MADE IN OPTIONAL DEVICE AREA<br>1: LOADING UNLOADING CAN BE NOT BE MADE IN OPTIONAL DEVICE AREA |
| SYS LOG ALIVE | 00: SYSTEM AREAS IS FORMED ONLY ON A TAPE<br>11: SYSTEM AREAS IS FORMED ON BOTH A MIC AND A TAPE |
| SKPFMT | 0: SKIP FORMATTING IS NOT MADE (PRE-FORMATTING IS MADE)<br>1: SKIP FORMATTING IS MADE |

FIG. 13

| BYTE \ BIT | 7 | 6 | 5 | 4 | 3 | 2 | 1 | 0 |
|---|---|---|---|---|---|---|---|---|
| 0 | PS (0) | RESERVED | | | PAGE CODE (11h) | | | |
| 1 | PAGE LENGTH (0Ah) | | | | | | | |
| 2 | MAXIMUM ADDITIONAL PARTITIONS (01h) | | | | | | | |
| 3 | ADDITIONAL PARTITIONS DEFINED (00h or 01h) | | | | | | | |
| 4 | FDP (0) | SDP (0) | IDP | PSUM (10b) | | RESERVED | | |
| 5 | MEDIUM FORMAT RECOGNITION (03h) | | | | | | | |
| 6 | RESERVED | | | | | | | |
| 7 | RESERVED | | | | | | | |
| 8 | (MSB) | | | PARTITION SIZE (PARTITION #0) | | | | |
| 9 | | | | | | | | (LSB) |
| 10 | (MSB) | | | PARTITION SIZE (PARTITION #1) | | | | |
| 11 | | | | | | | | (LSB) |

TAPE DRIVE APPARATUS AND RECORDING MEDIUM

BACKGROUND OF THE INVENTION

1. Field of the Invention

The present invention relates to a tape drive apparatus capable of making record or reproduction to or from a magnetic tape.

2. Description of the Related Art

Recently, there is known a tape streamer which uses a magnetic tape as a recording medium and can make relatively large capacity record. When the magnetic tape is used, pre-formatting is carried out to form a desired partition, and record or reproduction of desired data is made to or from a data area formed in this partition.

By the way, in the case where the partition is formed, pre-formatting is made to the magnetic tape to form a management information area necessary for record/reproduction of data, such as a device area and a system area, and a data area in which record/reproduction of data is made. In the case where a plurality of partitions are formed on the magnetic tape by this pre-formatting, as to partitions except the final partition, the pre-formatting is made from the beginning of the magnetic tape, so that an unformatted area is not formed between the respective partitions.

That is, data are recorded for forming the necessary device area and system area from the beginning of the magnetic tape, and further, in the data area, bytes to which dummy data of, for example, all zeros are specified are recorded.

Thus, when the pre-formatting is made to form the partitions, a considerable time is required. For example, in the case where two partitions each having, for example, 12.5 GB are formed for the magnetic tape having, for example, a capacity of 25 GB, when it is assumed that the maximum transfer speed at one time speed of a tape drive apparatus is 3 MB/sec, a time required for pre-formatting becomes $(25 \div 2) \div 3$, so that about 69 minutes is necessary for forming only the first partition. Like this, to form the partitions by making pre-formatting becomes processing which requires a considerable time.

That is, in the case where a tape cassette is newly used, or in the case where partitions are again formed to a tape cassette under use, there is a problem that it is necessary to carry out such a processing step requiring a considerable time.

SUMMARY OF THE INVENTION

In order to solve such a problem, according to the present invention, a tape drive apparatus is structured by comprising tape drive means for recording or reproducing information to or from a magnetic tape when a tape cassette containing the magnetic tape is loaded; memory drive means for, in a case where the loaded tape cassette is provided with a memory for storing management information to manage recording or reproducing to or from the magnetic tape, reading or writing the management information from or to the memory; tape running means for running the magnetic tape; tape running amount detecting means for detecting a running amount of the magnetic tape run by the tape running means; tape running amount calculating means for calculating a tape running amount corresponding to a capacity of a data area of a partition to be formed on the magnetic tape; and control means for controlling the tape drive means and the tape running means such that in a case where at least each of first to (n−1)-th partitions (where, "n" is the number of the partitions to be formed) is formed on the magnetic tape, after a first management information area is formed from a necessary position on the magnetic tape, tape running is executed by the tape running means in a period until running of the magnetic tape corresponding to the tape running amount calculated by the tape running amount calculating means is detected, and thereafter, a second management information area is formed on the magnetic tape so that one partition is formed.

Further, the control means causes the magnetic tape in a position corresponding to the data area to run at a speed higher than that in a case where the first and second information management areas are formed.

Moreover, a tape drive apparatus is structured by comprising tape drive means for recording or reproducing information to or from a magnetic tape when a tape cassette containing the magnetic tape is loaded; memory drive means for, in a case where the loaded tape cassette is provided with a memory for storing management information to manage recording or reproducing to or from the magnetic tape, reading or writing the management information from or to the memory; tape running means for running the magnetic tape; tape running amount detecting means for detecting a running amount of the magnetic tape run by the tape running means; tape running amount calculating means for calculating a tape running amount from a certain position on the magnetic tape to a necessary position; and control means for controlling the tape drive means and the tape running means such that in a case where reading or recording of data is performed by moving the magnetic tape to a necessary partition from a present position on the magnetic tape, on the basis of identification information indicating a forming system of the partition stored in the memory, in a period until the tape running amount by the tape running amount calculating means is detected, tape is run by the tape running means, so that a recording position or a reproducing position on the magnetic tape is moved.

Further, in a case where the moving operation is performed, the control means controls the tape running means so that the magnetic tape runs at a speed higher than a speed at which a normal recording or reproducing operation is carried out.

Moreover, as a recording medium, in the recording medium comprising a magnetic tape and a memory for storing management information to manage record or reproduction to or from the magnetic tape, identification information for identifying a formation system of a partition formed on the magnetic tape is recorded in the memory.

According to the present invention, on the basis of the management information of the memory, a partition can be formed without writing in a data area. In this case, since the magnetic tape is made to run on the basis of the management information of the memory and the number of revolutions of a reel motor, a load in writing processing of data at formation of the partition can be reduced, and it becomes possible to quickly form the partition. Further, at the position corresponding to the data area, the magnetic tape is made to run at a speed faster than the case where necessary data are written in the management information area, so that it becomes possible to form the partition at a higher speed.

Moreover, even in the case where reproduction or record of data is carried out from or to the partition formed without carrying out writing in the data area, on the basis of the management information of the memory, it becomes possible to move to a desired position on the magnetic tape. In this case as well, since the magnetic tape is made to run on the basis of the management information of the memory and the number of revolutions of the reel motor, high speed movement can be realized.

Further, as the recording medium, from the management information stored in the memory, it is possible to identify the forming method of the partition made up of a first management information area, a data area, and a second management information area to the magnetic tape, so that it becomes possible to cause a tape drive apparatus corresponding to pre-formatting or skip formatting to have general-purpose properties.

BRIEF DESCRIPTION OF THE DRAWINGS

FIG. 9 is an explanatory view of data contents of a manufacture part;

FIGS. 11A and 11B are explanatory views of data contents of a volume information of the MIC;

FIGS. 12A and 12B are explanatory views of a mode setting command of the embodiment;

FIG. 13 is an explanatory view of a format command of the embodiment;

DETAILED DESCRIPTION OF THE PREFERRED EMBODIMENT

Figure 1:
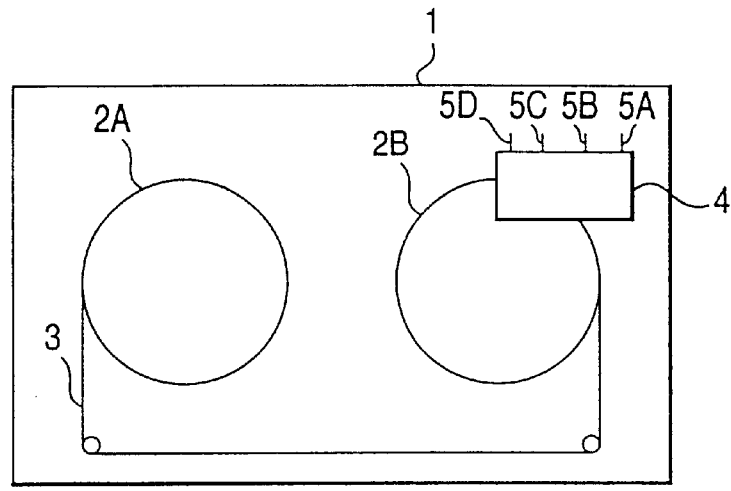
FIG. 1 is an explanatory view schematically showing the inside structure of a tape cassette of the embodiment.

Hereinafter, the mode for carrying out the invention will be described.

Here, although the present applicant has proposed various inventions as to a tape cassette provided with a nonvolatile memory, and a tape drive apparatus (tape streamer) capable of recording/reproducing digital data correspondingly to the tape cassette with the memory, the present invention is made such that a data storage system constituted by the tape cassette with the memory and the tape streamer is applied to the present invention. Incidentally, the nonvolatile memory equipped in the tape cassette will be hereinafter referred to as an MIC (Memory In Cassette). Besides, the tape streamer of this embodiment corresponds to also a tape cassette in which the MIC is not provided.

The description will be made in the following order.
1. Structure of a tape cassette
2. Structure of a recording/reproducing apparatus
3. Structure of data recorded on a magnetic tape
4. Data structure of an MIC
5. Mode setting command
6. Format command
7. Transition of partition formation
8. Operation at reproducing and recording 1. Structure of a Tape Cassette First, with respect to a tape cassette with an MIC corresponding to a tape streamer of this embodiment will be described with reference to FIG. 1 and FIG. 2.

FIG. 1 conceptually shows an inner structure of a tape cassette, and in the inside of a tape cassette 1 shown in this drawing, reel hubs 2A and 2B are provided and a magnetic tape 3 with a tape width of 8 mm is wound between the reel hubs 2A and 2B.

This tape cassette 1 is provided with a MIC 4 as a nonvolatile memory, and a power source terminal 5A, a data input terminal 5B, a clock input terminal 5C, an earth terminal 5D, and the like are drawn out from the module of the MIC 4. In this MIC 4. As described later, the manufacturing date and manufacturing place of each tape cassette, the thickness and length of the tape, its material, information relating to, for example, a use history of recording data for each partition, user information, and the like are stored.

Incidentally, in the present specification, since various information stored in the MIC 4, information of a system area recorded on the magnetic tape described later, and the like are mainly used for various management of record/reproduction to the magnetic tape 3, these are collectively referred to as "management information" as well.

Figure 2:
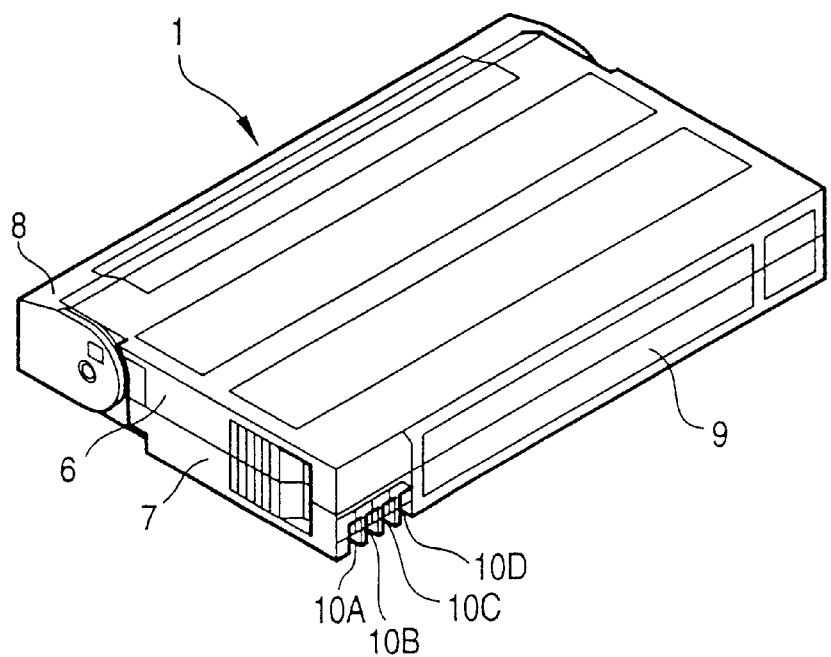
FIG. 2 is a perspective view showing the outer appearance of the tape cassette of the embodiment.

FIG. 2 shows an example of the outer appearance of the tape cassette 1, and the whole of its receptacle is constituted by an upper case 6, a lower case 7, and a guard panel 8, and is basically the same as a structure of a tape cassette used for a normal 8 mm VTR. Terminal pins 10A, 10B, 10C, and 10D are provided on a label surface 9 of a side surface of the tape cassette 1, and are connected to the power source terminal 5A, the data input terminal 5B, the clock input terminal 5C, and the earth terminal 5D described in FIG. 1, respectively. That is, in this embodiment, the tape cassette 1 is physically brought into contact with a subsequently described tape streamer through the terminal pins 10A, 10B, 10C, and 10D, and mutual transmission of data signals and the like is carried out.

2. Structure of a Recording/reproducing Apparatus

Figure 3:
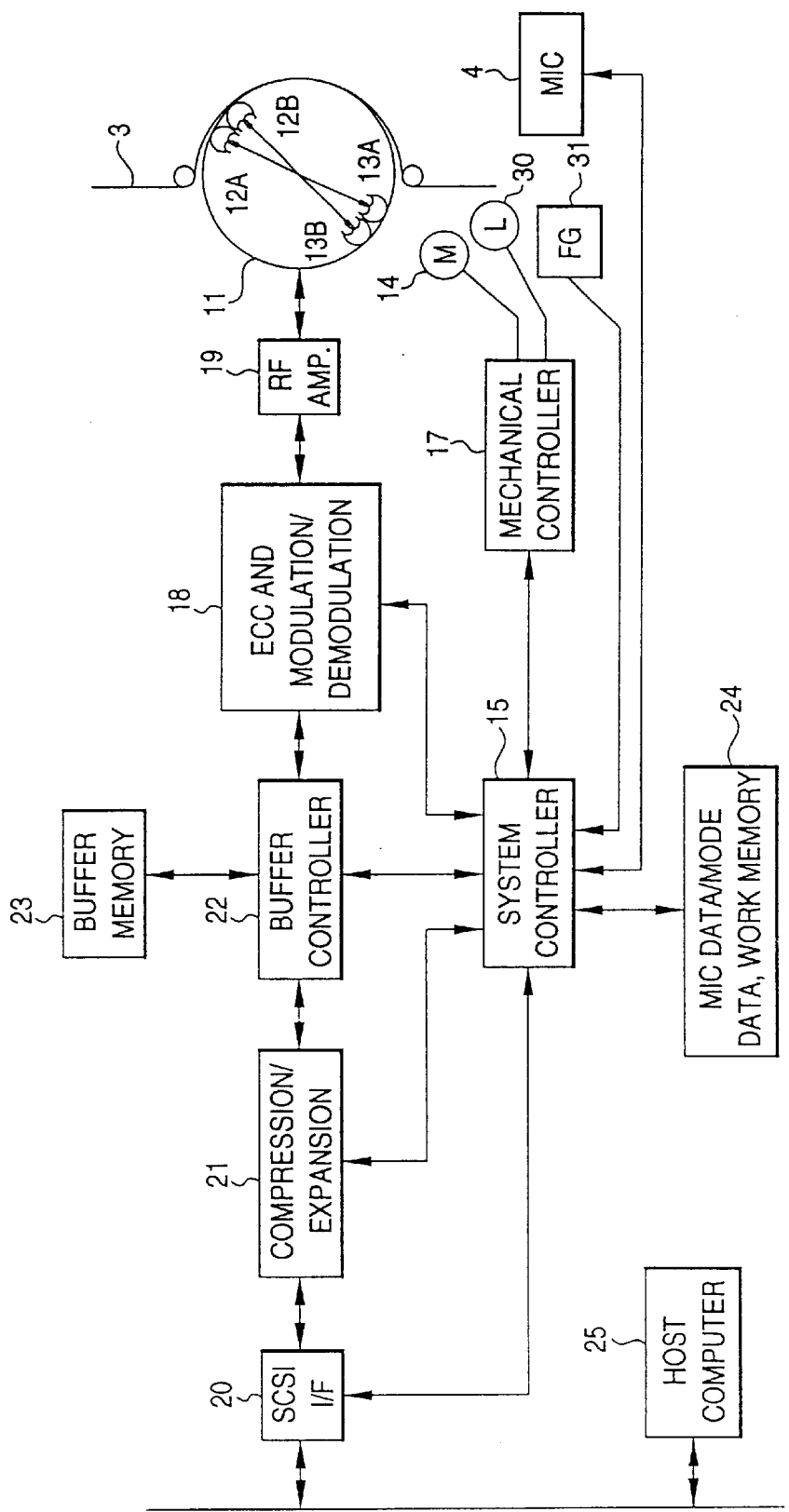
FIG. 3 is a block diagram of a tape streamer of an embodiment of the present invention.

Next, the structure of the tape streamer of this embodiment will be described with reference to FIG. 3. This tape streamer is designed such that record/reproduction is performed to/from a magnetic tape by using a tape cassette of a tape width of 8 mm and by a helical scan system.

In this drawing, for example, two recording heads 12A and 12B and two reproducing heads 13A and 13B are provided in a rotating drum 11. The recording heads 12A and 12B have a structure in which two gaps with azimuth angles different from each other are arranged to be very close to each other. Similarly, the reproducing heads 13A and 13B also have a structure in which two gaps with azimuth angles different from each other are arranged to be very close to each other.

The rotating drum 11 is rotated by a drum motor 14, and is wound with a magnetic tape 3 drawn out from the tape cassette 1. Further, the magnetic tape 3 is fed by a not-shown capstan motor and pinch roller. The drum motor 14 is driven by control of a mechanical controller 17. The mechanical controller 17 performs servo control and tracking control of the drum motor 14, and is bidirectionally connected to a system controller 15 performing control processing of the whole system.

Besides, the mechanical controller 17 performs drive control of a reel motor 30 for rotating the reel hubs 2A and 2B (not shown). A reel FG 31 is made to be capable of generating a required FG pulse corresponding to the number of revolutions of the reel motor 30. The FG pulse generated by this reel FG is supplied to the system controller 15, and the system controller 15 can detect the number of revolutions of the reel hubs 2A and 2B on the basis of the number of the FG pulses.

In this tape streamer, an SCSI interface 20 is used for input/output of data. For example, at the time of data recording, data are sequentially inputted through the SCSI interface 20 in a transmission unit of fixed length record from a host computer 25 and are supplied to a compression/expansion circuit 21. Incidentally, in such a tape streamer system, although there is a mode in which data are transmitted from the host computer 25 in a collective unit of variable-length data, its explanation will be omitted here.

In the compression/expansion circuit 21, inputted data are subjected to compression processing with a predetermined system if necessary. As an example of the compression system, for example, if a compression system by an LZ code is adopted, in this system, an exclusive code is assigned to a character string processed in the past and is stored in the form of a dictionary. Then a character string inputted later is compared with the contents of the dictionary, and if the character string of the input data coincides with the code of the dictionary, this character string data are replaced by the code of the dictionary. Data of an input character string which did not coincide with the dictionary are sequentially given a new code and are registered in the dictionary. In this way, data of input character strings are registered in the dictionary, and the character string data are replaced by the codes of the dictionary, so that data compression is carried out.

The output of the compression/expansion circuit 21 is supplied to a buffer controller 22, and the buffer controller 22 makes a control operation so that the output of the compression/expansion circuit 21 is temporarily stored in a buffer memory 23. In the data stored in this buffer memory 23, the data are finally made to be treated in a fixed length unit corresponding to 40 tracks of the magnetic tape 3 called a group (Group) through the control of the buffer controller 22 as described later, and the data are supplied to an ECC modulation/demodulation circuit 18.

In the ECC modulation/demodulation circuit 18, an error correction code is added to the input data, and the input data are subjected to modulation processing to be adapted to magnetic recording and are supplied to an RF amplifier 19. A recording signal amplified by the RF amplifier 19 is supplied to the recording heads 12A and 12B so that recording of data to the magnetic tape 3 is carried out.

Further, a data reproducing operation will be briefly described. Recording data of the magnetic tape 3 are read out as an RF reproduced signal by the reproducing heads 13A and 13B, the reproduced output is supplied to the ECC modulation/demodulation circuit 18 through the RF amplifier 19, and is subjected to error correction processing after demodulation processing. The demodulated output of the ECC modulation/demodulation circuit 18 is temporarily stored in the buffer memory by the control of the buffer controller 22, and is supplied to the compression/expansion circuit 21 from here.

In the compression/expansion circuit 21, on the basis of the judgement of the system controller 15, when the data were subjected to compression by the compression/expansion circuit 21 at the time of recording, data expansion processing is carried out here, and when the data are uncompressed data, data expansion processing is not carried out but the data pass through as they are and are outputted.

The output data of the compression/expansion circuit 21 are outputted to the host computer 25 as reproduced data through the SCSI interface 20.

Further, this drawing shows the MIC 4 together with the magnetic tape 3 of the tape cassette. When the body of the tape cassette is loaded into the tape streamer, this MIC 4 is connected to the system controller 15 through the terminal pins shown in FIG. 2 so that input/output of data is enabled.

A work memory 24 is a memory which the system controller 15 uses to store data read out from the MIC 4, data to be written into the MIC 4, various flag data, and the like, to perform arithmetic processing, and so on. Incidentally, this work memory 24 may be constituted as an internal memory of a microcomputer constituting the system controller 15, or such a structure may be adopted that a part of the area of the buffer memory 23 is used as the work memory 24.

Mutual transmission of information is carried out between the MIC 4 and the external host computer 25 by using SCSI commands. Thus, it is not necessary to provide an exclusive line between the MIC 4 and the host computer 25, and as a result, data transfer between the tape cassette and the host computer 25 can be made through only the SCSI interface.

Further, although the system controller 15 carries out various communications using the SCSI commands to the host computer 25, especially in this embodiment, mode setting of the tape cassette or formation of partitions by skip formatting described later are executed in accordance with the SCSI commands given to the system controller 15 from the host computer 25.

3. Structure of Data Recorded on a Magnetic Tape

Next, a data format applied to the foregoing data storage system constituted by the tape streamer and the tape cassette will be schematically described.

Figure 4:
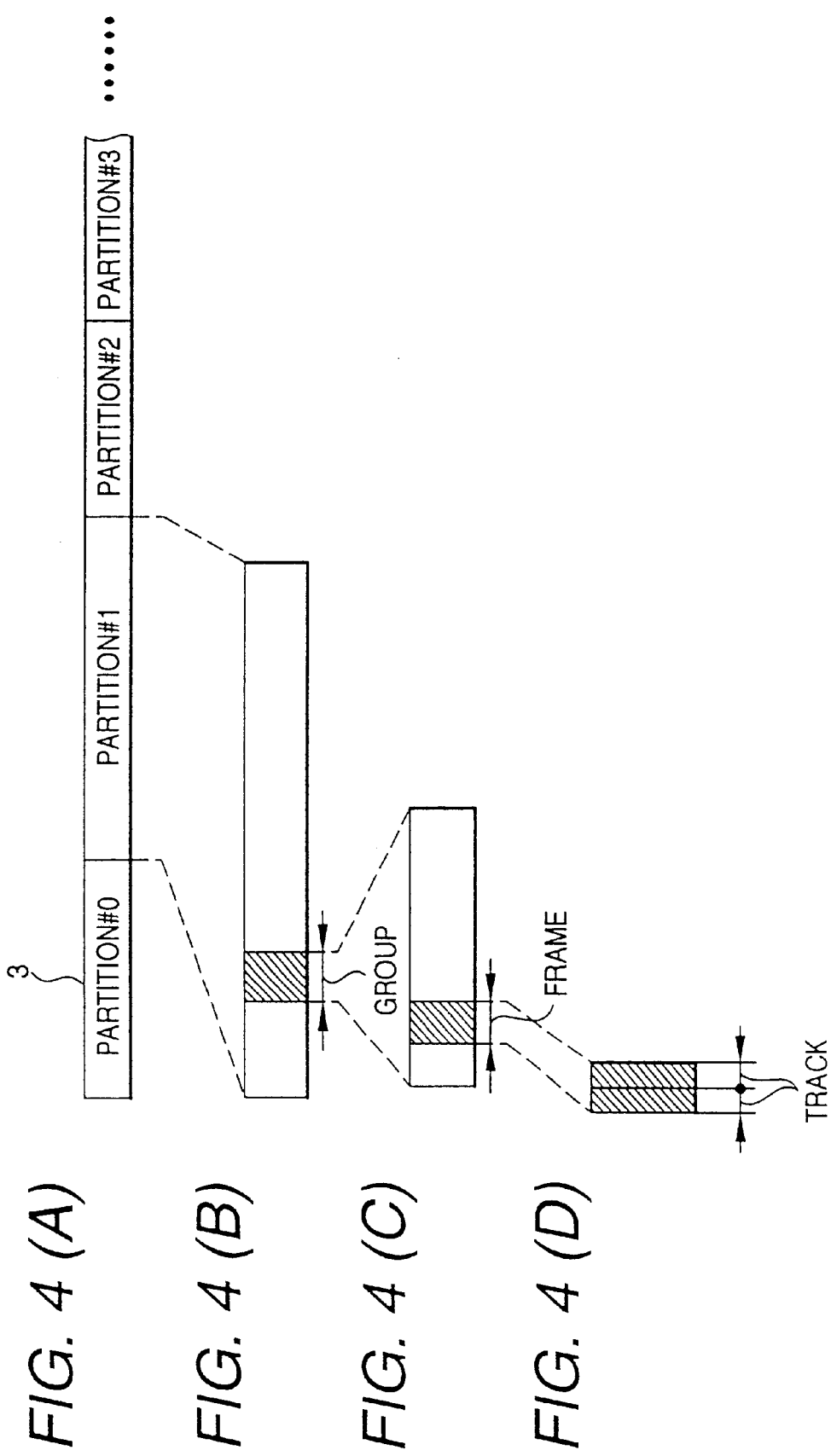
FIGS. 4A–4D are schematic views showing a data structure recorded on a magnetic tape.

FIG. 4 schematically shows the structure of data recorded on the magnetic tape 3.

FIG. 4(A) shows the one magnetic tape 3. In the case where a plurality of partitions are formed, as shown in FIG. 4(B), the one magnetic tape 3 can be divided into a partition (Partition) unit and can be used, and in the system of this embodiment, it is possible to set a maximum of 256 partitions and to manage them. Besides, the respective partitions shown in this drawing are managed by being given a partition number as designated by partition #0, #1, #2, #3 . . . .

Thus, in this embodiment, although record/reproduction and the like of data can be made independently for each partition, for example, the recording unit of data in one partition shown in FIG. 4(B) can be divided into a fixed length unit called a group (Group) shown in FIG. 4(C), and recording to the magnetic tape 3 is carried out in the unit of each group.

In this case, one group corresponds to a data amount of twenty frames, and as shown in FIG. 4(D), one frame is formed of two tracks. In this case, two tracks forming one frame are made a plus azimuth track and a minus azimuth track adjacent to each other. Thus, one group is formed of forty tracks.

Figure 5:
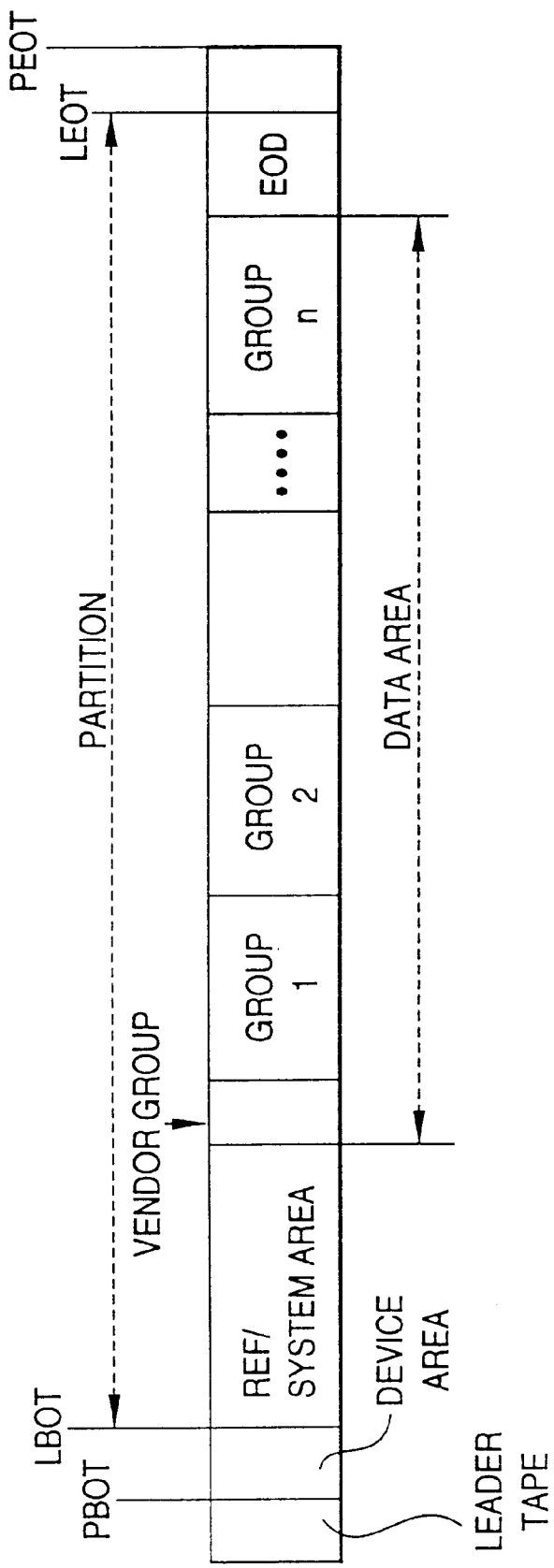
FIG. 5 is a schematic view showing data structure in 1 partition.

Further, one partition shown in FIGS. 4(A) and 4(B) is formed of a data structure shown in FIG. 5. Incidentally, in this drawing, a description will be made on the assumption that one partition is formed for the whole tape length. Further, although this embodiment is structured such that the MIC 4 is provided for the tape cassette, and the later described data structure on the magnetic tape 3 is adopted, so that loading/unloading in the middle of a tape is made possible, a general-purpose format capable of dealing with the tape cassette without the MIC 4 is shown here.

In the case of FIG. 5, a leader tape is physically positioned at the beginning with respect to an initial portion of the magnetic tape, and a device area which becomes an area of carrying out loading/unloading of the tape cassette is next provided. The beginning of this device area is made a PBOT (Physical Biginning of Tape).

Subsequent to the device area, a reference area and a system area in which use history information and the like of the tape is stored (hereinafter, the areas including the reference area will be referred to as "system area") are provided, and a data area is provided subsequently. The beginning of the system area is made an LBOT (Logical Biginning of Tape).

In the data area, a vendor group indicating information as to a vendor which prepares and supplies data is first provided, and next, groups actually shown in FIG. 4(C) are continuously formed as designated here by groups 1 to n. Subsequently to the final group n, an area of EOD (End of Data) indicating the end of the data area of the partition is provided. The end of the EOD is made an end position LEOT (Logical End of Tape of a logical tape).

A PEOT (Physical End of Tape) indicates the end position of the physical tape or physical end position of the partition.

FIG. 6(A) shows an example in which one partition is formed on the magnetic tape 3 and is used, and this case becomes almost the same layout as that explained in FIG. 5.

FIG. 6(B) shows an example in which a plurality of partitions #0 to #(N−1) are formed.

Here, in the case where the plurality of partitions are formed, in addition to the areas explained in FIG. 5, an optional device area is finally provided to the end of each of the partitions.

As described above, although the device area near the tape top is made the area for loading/unloading, the optional device area is an area prepared to enable loading/unloading in a partition unit (that is, loading/unloading in the middle of the tape).

The tape layout of forming the plurality of partitions as in FIG. 6(B) can be realized by only the tape cassette 1 with the MIC 4.

Figure 6:
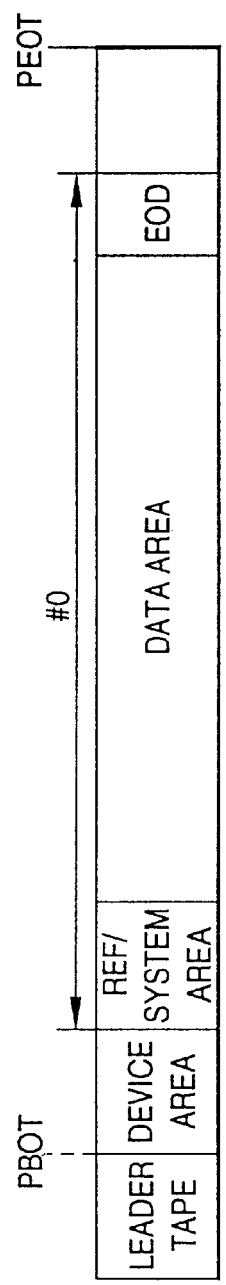
FIGS. 6A and 6B are explanatory views of a tape layout.
Figure 6:
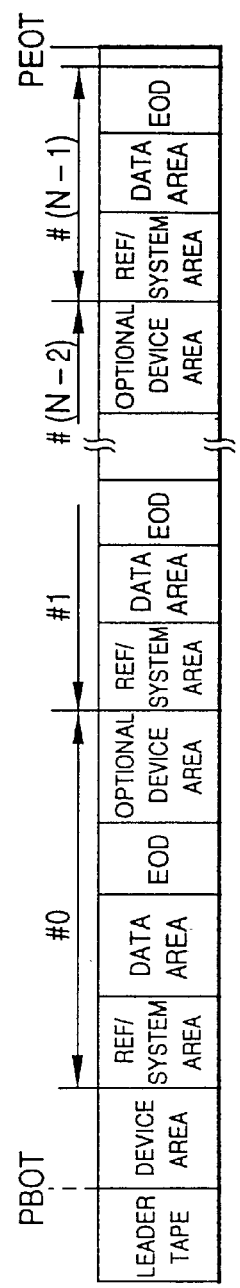

The respective partitions in the tape layout shown in FIG. 6 is formed by continuously recording required data from the beginning of the magnetic tape 3 by carrying out pre-formatting as described before. Incidentally, the EOD is formed after data writing is actually carried out in the data area.

However, since this requires a considerably long time for the formation of the partition, in this embodiment, writing of dummy data and the like is not carried out for the portion corresponding to the data area, but the magnetic tape is made merely to run (skip) and writing of only necessary management information is carried out, so that skip formatting capable of forming the partition is realized.

By this, a partition forming time is shortened, and a time of search of a desired position or the like in the case where record/reproduction of data is carried out to the formed partition can be shortened.

Incidentally, an operation transition of partition formation by the skip formatting and a search operation of the record/reproduction position of data will be described later in detail 4. Data Structure of MIC Next, the data structure of the MIC 4 equipped to the tape cassette 1 will be described.

Figure 7:
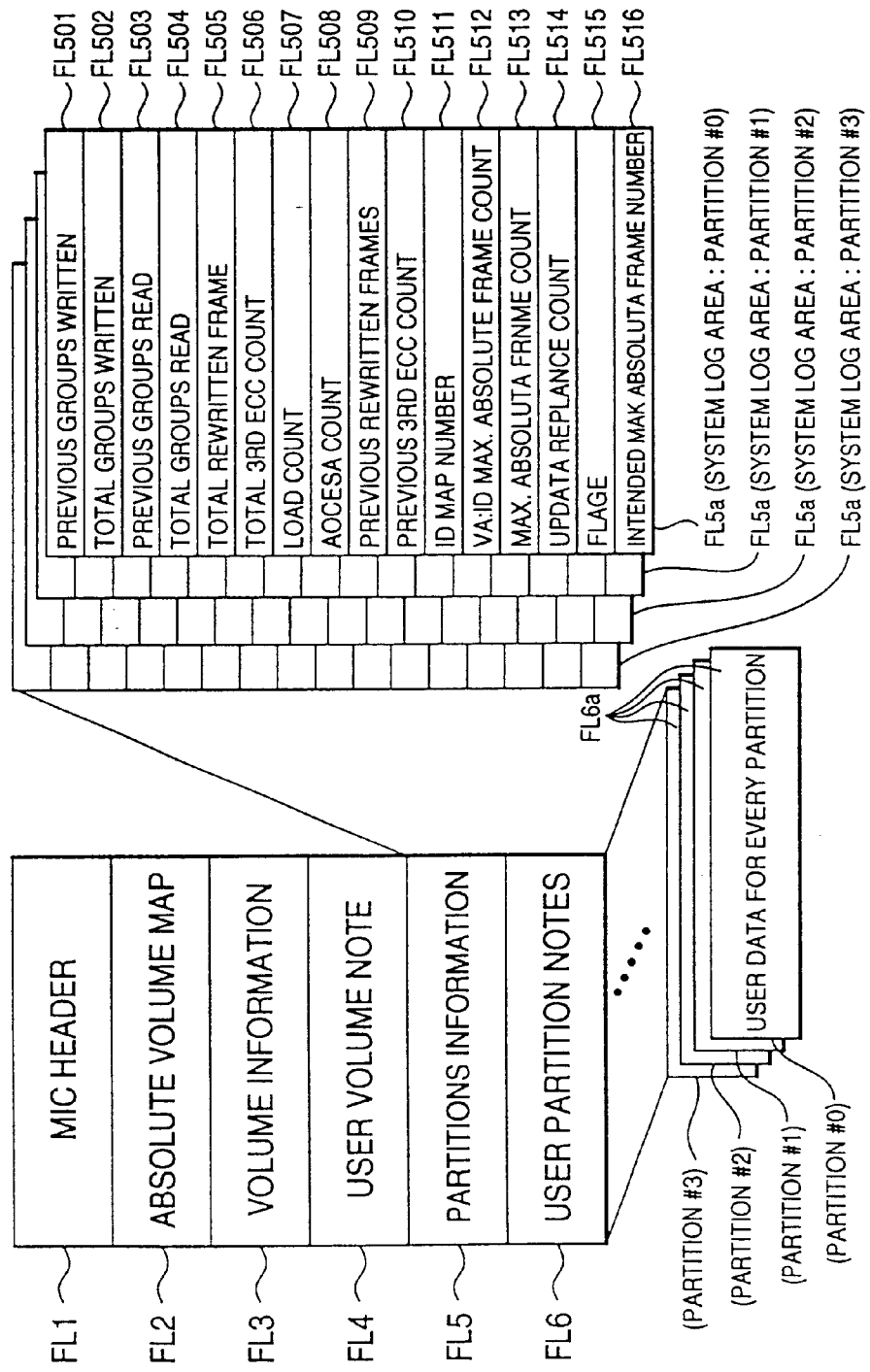
FIG. 7 is a schematic view showing the data structure of an MIC.

FIG. 7 is a view schematically showing an example of the structure of data stored in the MIC 4. The capacity of the MIC 4 is made, for example, two mega-bytes, and fields FL1 to FL6 are set for this area as shown in the drawing.

In these fields FL1 to FL6, the field FL1 is made an MIC header (MIC HEADER), and various information at the time of manufacture of the tape cassette, tape information at the time of initializing, information for each partition, and the like are written.

Figure 8:
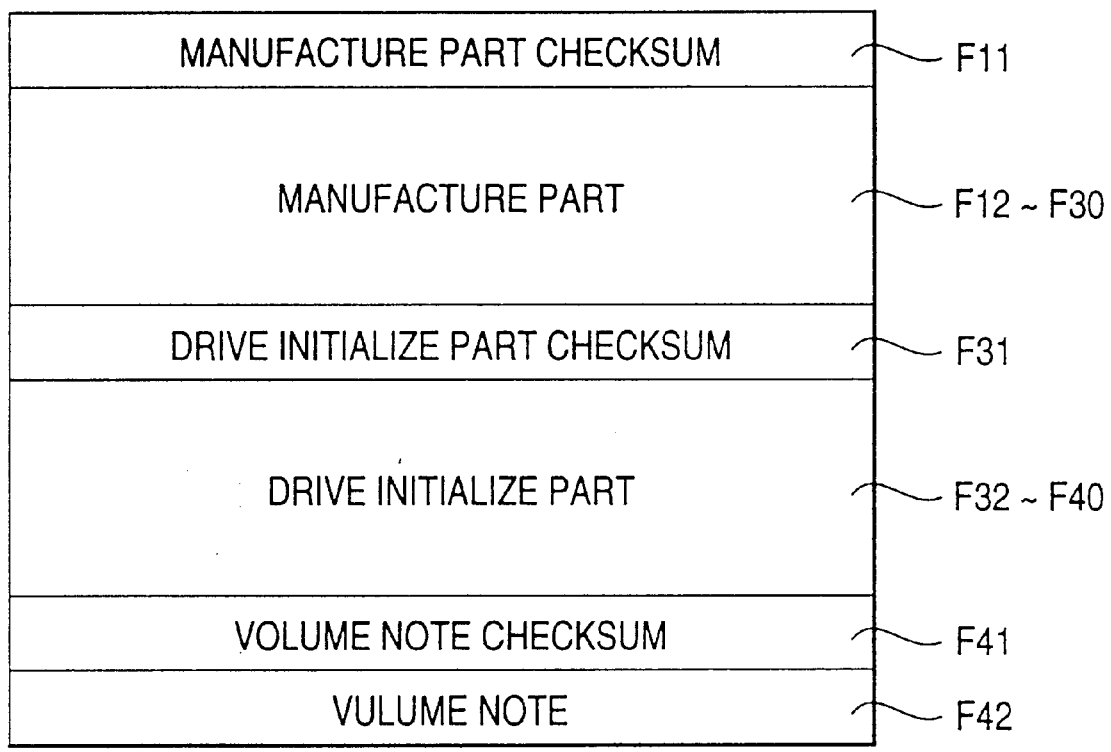
FIG. 8 is a schematic view showing the structure of an MIC header.

An example of data contents written in the MIC header is as shown in FIG. 8.

The MIC header is roughly constituted by individual fields, for example, a manufacture part checksum (Manufacture Part_Checksum) F11 and manufacture parts (Manufacture_Parts) F12 to F30, a drive initialize part checksum (Drive_Initialize Part_Checksum) F31 and drive initialize parts (Drive_Initialize Parts) F32 to F40, a volume note checksum (Volume_Note Checksum) F41, and a volume note (Volume Note) F42.

Information relating to the time of manufacture of the MIC and the tape cassette is stored in the fields F12 to F30 corresponding to the manufacture part, and information relating to MIC data given at initializing is recorded in the fields F32 to F40 corresponding to the initialize part.

Further, in the field F41 as the volume note checksum, checksum information of the field F42 as the volume note of an area which a vendor can freely use is stored.

Hereinafter, the manufacture part and the initialize part will be described in detail.

FIG. 9 is a view for explaining the structure of the manufacture part.

In FIG. 9, the field F11 is made the manufacture part checksum (manufacture_part_checksum), and information of checksum of the manufacture part is stored. The information of the manufacture part checksum is given at the time of manufacture of the cassette.

The field F12 constituting the manufacture part is made a field of an MIC type (mic_type), and is made to indicate the type of the MIC actually equipped to the tape cassette.

The field F13 is made an area of an MIC manufacture date (mic_manufacture_date), and the manufacture date (and time) of the MIC is indicated. The field F14 is made an area of an MIC manufacture line name (mic_manufacture_line_name), and information of a name of a manufacture line of the MIC is indicated. The field F15 is made an area of an MIC manufacture plant name (mic_manufacture_plant_name), and information of a name of a factory manufacturing the MIC is indicated. The field F16 is made an MIC manufacturer name (mic_manufacturer_name), and information of a manufacturing company name of the MIC is indicated, and the field F17 is made an area of an MIC name (mic_name), and information of a vendor name of the MIC is indicated.

The fields F18 to F22 are made areas of a cassette manufacture date (cassette_manufacture date), a cassette manufacture line name (cassette_manufacture_line_name), a cassette manufacturer plant name (cassette_manufacture_plant_name), a cassette manufacturer name (cassette_manufacturer_name), and a cassette name (cassette_name), respectively. Incidentally, their definition contents are made such that the definition contents of the respective areas of the foregoing fields F13 to F17 are applied to the cassette itself.

The field F23 is made an area of an OEM customer name (oem_customer_name), and information of the other company name of OEM (Original_Equipment_Manufactures) is stored.

The field F24 is made an area of a raw format ID (RawFormat_ID), and information of physical characteristics of the magnetic tape, for example, a material of the tape, a tape thickness, a tape length, a track pitch, a frame size, the number of bytes for one block, and the like are indicated.

The field F25 is made an area of a maximum clock frequency (maximum_clock_frequency), and information indicating the maximum clock frequency with which the MIC copes is stored. The field F26 is made an area of a maximum write cycle (maximum_write_cycle), and information as to, for example, how many bytes can be recorded at one time is indicated as the characteristics of the MIC. This information depends on the physical characteristics of a nonvolatile memory used as the MIC.

The field F27 is made an area of MIC capacity (mic_capacity), and information of storage capacity of the MIC is indicated.

The field F28 is made an area of a write protect top address (write_protect_top_address), and this area is used to cause a required partial area of the MIC to inhibit writing and indicates a start address of the write inhibit area.

The subsequent field F29 is made an area of write protect count (write_protect_count), and the number of bytes of the write inhibit area is indicated. That is, the area occupied by the bytes of the byte number indicated by the area of the write protect count from the address indicated by the write protect top address of the field F28 is set as the write-inhibit area.

The area of the field F30 is made undefined (reserved), and is reserved for storing information which becomes necessary in future.

Figure 10:
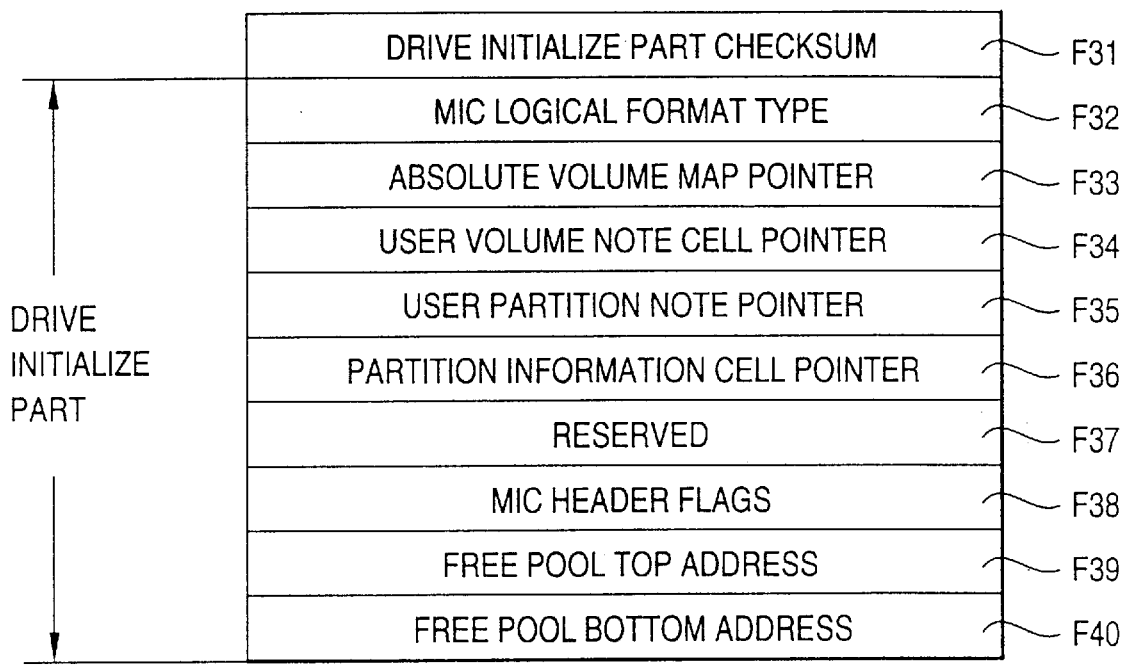
FIG. 10 is an explanatory view of data contents of a drive initialize part.

Subsequent to the field F30 of the manufacture part, as shown in FIG. 10, the field F31 of the drive initialize part checksum (drive_initialize_part_checksum) is formed, and information of checksum of the initialize drive part is stored.

The field F32 of the initialize drive part is made an area of an MIC logical format type (mic_logical_format_type), and an ID number of a logical format of the MIC is to be stored. As the MIC format, for example, other than the basic MIC format, various formats relating to a firmware update tape MIC format, a reference tape MIC format, a cleaning cassette MIC format, and the like exist, and the ID number corresponding to MIC format of the tape cassette is indicated.

Besides, in this embodiment, the magnetic tape 3 of the tape cassette is made identification information as to whether or not the pre-formatting has been carried out. Thus, in the case where partition formation is carried out by the pre-formatting or skip formatting described later, a necessary value corresponding to each is set as an identifier.

The field F33 is made an area of an absolute volume map pointer (absolute_volume_map_pointer), and a pointer indicating the address of the absolute volume map shown by the field FL2 of FIG. 7 is disposed.

The field F34 is made an area of a user volume note cell pointer (user_volume_note_cell_pointer), and in the case where, for example, one memory area where a user can freely read and write data through the SCSI is provided for one tape cassette, it indicates a start address of a structural body of a user volume note. Incidentally, the cell is made a data structure constituting a note.

Further, the field F35 is made an area of a user partition note pointer (user_partition_note_pointer), and in the case where, for example, one memory area where a user can freely read and write data through the SCSI is provided for one partition, it indicates a start address of a structural body of a user partition note.

The field F36 is made an area of a partition information cell pointer (partition_information_cell_pointer). Use history of the tape cassette is stored in a partition information cell (or called, for example, system log), the number of cells to be formed is made equal to the number of partitions formed on the magnetic tape 3, and all the partition information cells are linked to each other with a pointer and with a list structure. Thus, the partition information cell pointer is made a route indicating the address of the partition #0.

The field F37 is made an undefined (reserved) area.

The field F38 is made an area of an MIC header flag (MIC_Header_Flag), and is made one byte flag for providing a logical write inhibit tab to the MIC 4. That is, the contents indicated by the MIC header flag are made write enable/inhibit of a manufacture part portion, or write enable/inhibit of a portion other than the manufacture part.

The field 39 is made an area of a free pool top address (Free_Pool_Top_Address). In a memory area in the MIC, a header and a system log are formed toward address 0000h to FFFFh, and further, map information for high speed search is stored in the memory bottom. A portion placed between these two areas is made a free memory. For example, when the user volume note and the user partition note are formed, these are stored in the free memory. For the purpose of managing the free memory, the free pool top address indicates its start address.

Further, the end address of the free memory is stored in an area of a free pool bottom address (Free_Pool_Bottom_Address) of the field F40.

The field FL2 subsequent to the MIC header shown in FIG. 10 is made the absolute volume map (Absolute_Volume_Map) as shown in FIG. 7, and for example, absolute position information as to data recorded onto one reel of magnetic tape is stored.

The field FL3 is made the volume information (Volume_Information), and various use history information as to one reel of magnetic tape is stored. The information stored in these areas is used for record/reproduction control and the like in the tape streamer.

An example of data contents described in this volume information is shown in FIG. 11. As shown in the drawing, in all the volume information, as shown in FIG. 11(A), eject status (Eject_Status) of 20 bytes, reel diameter (Reel_Diameter) of 4 bytes, reserved zero data (Set_to_Zero) of 1 byte, initialize count (Initialize_Count) of 3 bytes, and volume information on tape (Volume_Information_On_Tape) of 72 bytes are described.

In the eject status, logical position information of the magnetic tape 3 in the case where the tape cassette is unloaded is described, and a reel diameter is made diameter information of both the reel hubs 2A and 2B at the point of time when the tape cassette is unloaded. Further, the initialize count is made information of the number of times the magnetic tape 3 has been initialized.

The contents of the volume information on tape become as shown in FIG. 11(B).

As shown in the drawing, in the volume information on tape, zero data of 4 bytes, zero data of 2 bytes, zero data of 3 bits, and then, super high speed search enable flag (Super_High_Speed_Search_Enable_Flag) of 1 bit, system log allocation flag (System_Log_Allocation_Flags) of 2 bits, always unload PBOT flag (Always_Unload_PBOT_Flag) of 1 bit, DDS emulation flag (DDS_Emulation_Flag) of 1 bit, last valid partition number (Last_Valid_Partition_Number) of 1 byte, and optional device area allocation map (Optional_Device_Area_Allocation_Map) of 32 bytes are described.

The super high speed search enable flag is made a flag which uses stored tape position information as the absolute volume map of the MIC 4 and indicates whether or not a function to further speed up high speed search is made effective.

The system log allocation flag is made a flag indicating where the use history (system log) of the tape cassette is stored, and is made to be capable of identifying whether, for example, it is recorded on only the magnetic tape 3, it is not recorded on neither the magnetic tape 3 nor the MIC 4, it is recorded on both the magnetic tape 3 and the MIC 4, or it is recorded on only the MIC 4.

The always unload PBOT flag is made a flag to indicate unloading in the device area existing in the PBOT even when multiple partitions are formed on the magnetic tape 3 and an optional device area exists in a partition. The DDS emulation flag is made a default mode (DDS compatible mode). The last valid partition number indicates the number of the formed last partition.

The optional device area map is made of 256 bits, and each one bit respectively corresponds to each partition formed on the magnetic tape 3. In the case where the value of the bit is made "1", it indicates that an optional device area is formed on the partition corresponding to the bit.

Further, in this example, in the case where a partition is formed by the skip formatting, this optional device area map is defined as the valid partition map(Valid_Partition_Map), and a value of a bit to be set is made "0" in the case where an unrecorded area exists in the formed partition, and is made "1" in the case where an unrecorded area does not exist and normal partition structure is made.

The field FL4 subsequent to the field FL3 as the foregoing volume information is made the user volume note (User_Volume_Note) as shown in FIG. 7, and information provided by a user (vendor etc.) relative to the tape cassette itself is stored, which is supplied to the external host computer 25 if necessary, and can be used for necessary processing control.

The field FL5 is made partition information (Partitions_Information), and various information relative to use history to the magnetic tape for each partition written onto the magnetic tape is stored, which the tape streamer uses as information for management of its own recording/reproducing operation. This partition information is formed of an area of a system log area FL5*a* as shown in the drawing.

Since the system log area FL5*a* is formed correspondingly to each partition recorded actually on the magnetic tape, the number of tables of the system log area FL5*a* corresponds to the number of partitions provided on the magnetic tape.

Since this system log area FL5*a* is formed correspondingly to each partition recorded on the magnetic tape 3, in the case where plural partitions are recorded on the magnetic tape, the system log area FL5*a* stores information relative to the partitions, but if the number of partitions is one, the information of the system log area FL5*a* becomes one relating to all the magnetic tape.

Incidentally, in the following explanation, the former case that the system log area FL5*a* stores information relative to partitions is made the assumption.

The data structure of one system log area FL5*a* is defined, for example, as shown in the drawing.

First, a field FL501 is made an area of previous groups written (Previous_Groups_Written). This area indicates information of the number of groups in the partition physically recorded onto the magnetic tape and counting from the time when the system log area F5*a* has been finally updated.

Further, a field FL502 is made an area of total groups written (Total_Groups_written), and the total number of groups hitherto recorded to the partition is indicated. This value is added up until the tape cassette is almost dead and thus it becomes unusable or is discarded.

As to the previous groups written and the total groups written, for example, when data are being recorded onto the magnetic tape 3 by the tape streamer, the value of the area is made to increment by the processing of the system controller 15 of the tape streamer and in accordance with the number of groups newly recorded by the present recording operation.

A field FL503 is made previous groups read (Previous_Groups_Read) and, counting from the time when the system log area FL5*a* is finally updated, the number of groups where reading has been physically performed is indicated.

A field FL504 is made total group read (Total_Group_Read), and indicates an integrated value of the number of groups which have been read out from the partition until now.

A field FL505 is made an area of total written frame (Total_Written_Frame).

By the way, in the tape streamer of this embodiment, the reproducing heads 13A and 13B are provided to the rotating head 11 such that the reproducing heads are positioned to proceed the recording heads 12A and 12B by a predetermined number of tracks. At the time of recording, although recording is performed by the two recording heads 12A and 12B on the magnetic tape in a frame (two tracks) unit, in the reproducing heads 13A and 13B, reading of data is performed from the frame previously written onto the magnetic tape by the recording heads 12A and 12B. Such operation is called READ-AFTER-WRITE (hereinafter abbreviated to RAW). In the data of the frame read out through the RAW, an error rate is detected by the system controller 15, and in the case where it is detected that error has occurred, control of the recording system is made to rewrite the data of the frame where the error has occurred.

The total written frame of the field FL505 indicates an integrated value of the number of frames where request for data rewriting has been made on the basis of the RAW in the partition.

A field FL506 is made an area of total 3rd ECC count (Total_3rd_ECC_count). In the tape streamer system of this embodiment, as to data read out from the magnetic tape 3, although error correction is carried out by parity of C1, C2, and C3, the C3 parity is used in the case where recovery of data can not be made by only the C1 and the C2 parity. In the total 3rd ECC count, an integrated value of the number of groups where error correction has been carried out using the C3 parity in the partition is indicated.

A field FL507 is made an area of load count (Load_count), and an integrated value of the number of times of loading of the tape is indicated.

A field FL508 is an area of access count (Access_count), and the number of times where the tape streamer has accessed the partition is indicated.

A field FL509 is made an area of previous rewritten frame (Previous_rewritten_frame), and through the RAW previously explained, counting from the time when the system log area FL5a has been finally updated, information of the number of frames in the partition where request for data rewriting has been made is indicated.

A field FL510 is made previous 3rd ECC count (Previous_3rd_ECC_count) and, counting from the time when the system log area FL5a has been finally updated, the number of groups where error correction using the C3 parity has been made is indicated.

A field FL511 is made ID map number (ID_Map_number), and information of a definition number of an index for search is stored.

In the valid maximum absolute frame count (Valid_Max.Absolute_frame_count) of a field FL512, information of frame count until the final frame effective in the partition is indicated, and in an area of maximum absolute frame count (Max.Absolute_frame_count) of a field FL513, information of final frame count of the partition is indicated.

Further, in an area of update replace count (Update Replace_count) of a field FL514, information of integration of the number of times where data have been rewritten onto the magnetic tape in the partition by update is indicated.

In an area of flags (Flags) of the final field FL515, data such as, for example, flags indicating write enable/inhibit to the partition, read enable/inhibit, and rewrite enable/inhibit of data based on the RAW at recording, and flags indicating that some processing is being carried out to the partition by tape streamer are stored.

Further, in this embodiment, as a field FL516, an area for storing intended max absolute frame number (Intended_Max.Absolute_Frame Number . . . , hereinafter referred to as "intended max AFN") is provided. This intended max AFN indicates the maximum AFN in the partition. This is made a value calculated as the number of frames specified for obtaining the capacity of the partition instructed from the host computer 25 in the case where formation of the partition is made by the skip formatting as described later.

The field FL6 subsequent to the field FL5 with the above contents is made user partition notes (User_partition_Notes), and various information such as comments which a user can write for each partition is stored. The user partition note of this field FL6 is formed of user data area FL6a (User_Data_for_every_Partition) prepared correspondingly to each partition recorded on the magnetic tape.

Incidentally, the data structure of the MIC4 shown in FIGS. 7 to 11 is an example showing necessary items in explaining this embodiment, and there are items whose illustrations or explanations are omitted for convenience.

5. Mode Setting Command

FIG. 12(A) shows data contents of a mode setting command (10 bytes) issued by the host computer 25.

First, page code (Page Code) indicates a mode setting command, and page length (Page Length) indicates the length (byte number) of data contents subsequently described.

As real data contents of the command, AIT, Device, ABS, ULPBOT, SysLogAlive, SPAN, and MIC are described. Further, in this invention, SKPFMT is defined at the 6th bit of the 4th byte.

FIG. 12(B) shows the respective data contents, and first, the AIT bit becomes information indicating, for example, a mode of forming one partition (for example, called a normal mode) or, for example, a mode of forming a plurality of partitions (for example, called a multi-partition mode).

The Device bit is information instructing whether or not the optional device area is formed.

The ABS bit is information instructing whether or not the absolute volume map is formed.

The ULPBOT bit is information instructing whether or not loading/unloading is permitted in the optional device area.

The SysLogAlive (system log alive) is information instructing a system area forming portion (MIC and magnetic tape).

The SKPFMT (SKIPFORMAT) bit is made information instructing the tape streamer which of the pre-formatting and skip formatting is to be carried out to make partition formation. In the case where the skip formatting is carried out, the SKPFMT bit is made, for example, "1". This SKPFMT bit is stored not only in the work memory 24 of the tape streamer, but also to the magnetic tape 3 and the MIC 4. As to the magnetic tape 3 and the MIC 4, it is written when initializing is first carried out, and as to the magnetic tape 3, it is written into only the system log information of the partition formed at the beginning. Subsequently, the system log on the magnetic tape 3 is not updated, but only the MIC 4 is updated.

6. Format Command

FIG. 13 shows the contents of a format command issued by the host computer 25 as an SCSI command.

In this case, page code (Page_Code) indicates a format command, and page length (Page_Length) indicates the length (number of bytes) of data contents subsequently described.

As real data contents of the command, various information is described, and particularly, size information as to each partition to be set is described as partition size (Partition_Size).

Incidentally, although the example shown in this drawing indicates the case where two partitions are formed, the same can be applied to the case where three or more partitions are formed, and it is sufficient if a partition size of a desired partition is specified with a value indicated by 2 bytes. However, although the partition size is specified by PSUM (Partition_Size_Unit_of_Measured_field), in the example shown in FIG. 13, it is made "10b", that is, 10 MBytes.

7. Transition of Partition Formation

FIGS. 14(A) to 14(F) are schematic views for explaining a transition in the case where a partition is formed by the skip formatting.

Figure 14:
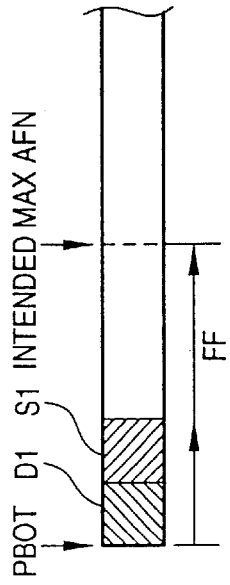
FIGS. 14A–14F are schematic views for explaining a transition of skip formatting of the embodiment.
Figure 14:
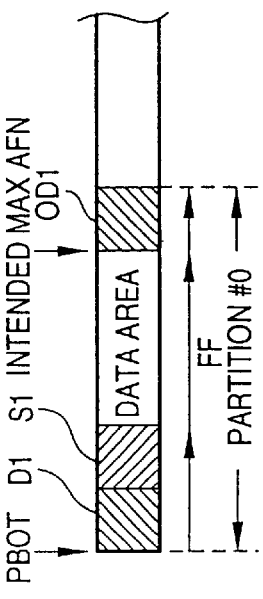
Figure 14:
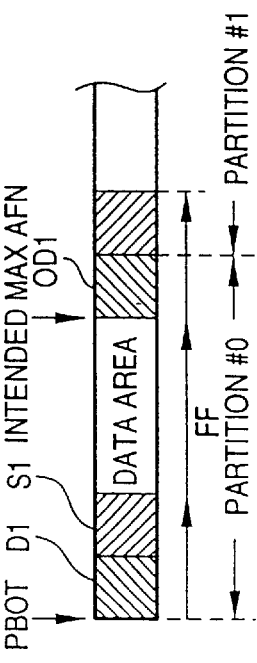
Figure 14:
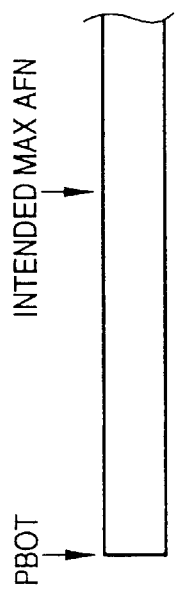
Figure 14:
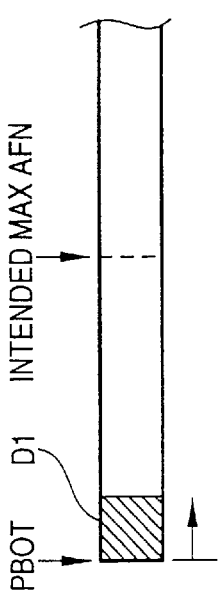
Figure 14:
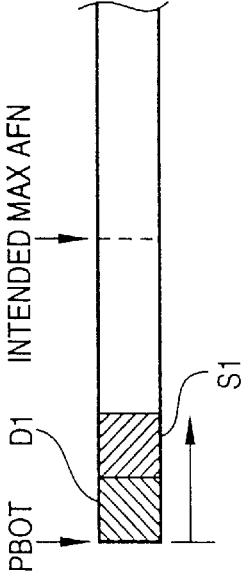

FIG. 14 (A) shows the state where recording has not been carried out to the magnetic tape 3. In this state, when the format command shown in FIG. 13 is supplied to the tape streamer from the host computer 25, calculation of intended max AFN (Intended Max_AFN) is performed.

Further, capacity for forming of a data area instructed by the format command from the host computer 25 is calculated with a frame as a data unit number. That is, the number of frames necessary for the required capacity is obtained as a count value of absolute frame (Absolute_frame_Number . . . AFN).

Then this AFN, that is, the intended max AFN is made to correspond to the number of revolutions of the reel motor 30 (reel hubs 2A and 2B). That is, a moving amount of the magnetic tape 3 until reaching the number of frames for obtaining the capacity of the data area is converted into the number of revolutions of the reel motor 30.

Thus, the tape streamer can grasp how many times the reel motor is to be rotated to obtain the desired capacity.

Next, as shown in FIG. 14(B), for example, a device area D1 is formed from the PBOT. The processing operation here is made writing processing of necessary information for forming the device area D1 to the magnetic tape 3. When the device area D1 is formed, next, as shown in FIG. 14(C), a system area S1 is formed, and also in the case of forming this system area S1, necessary information writing processing is performed.

When the device area D1 and the system area S1 (first management information area) are formed in this way, as shown in FIG. 14(D), the tape streamer executes an FF operation (fast-forward operation . . . skip). In this case, the system controller 25 counts FG pulses of the reel motor 30 supplied from the reel FG31, and at the point of time when the counted FG pulses correspond to the number of revolutions converted from the number of frames, writing processing of necessary information for forming an optional device area OD1 corresponding to a second management information area is carried out. That is, a data area is formed between the first management information area (device area D1, system area S1) and the second management information area (optional device area OD1).

That is, as shown in FIG. 14(E), "partition #0" is formed of the device area D1, the system area S1, the data area, and the optional device area OD1.

Although one partition is formed at the point of time shown in FIG. 14(E), in the case where formation of a partition is further carried out, as shown in FIG. 14(F), after the optional device area OD1 is formed, a system area S2 of a partition #1 subsequent to the partition #0 is formed. At this point of time, two partitions of the partitions #0 and #1 are formed on the magnetic tape 3.

That is, in the case where two partitions are formed, information actually written onto the magnetic tape 3 from the PBOT is the device area D1, the system area S1, the optional device area OD1, and the system area S2.

Incidentally, on the magnetic tape 3, it is necessary that a length in which the device area D1 or the optional device area OD1 is formed is made not shorter than a length in which sufficient movement with the accuracy of the reel FG can be made between both the device areas. For example, when the accuracy of the reel FG is about ±3 cm, it is satisfactory if the device area is made, for example, to have a length ten times as long as that, for example, about 60 cm.

In the case where the partition is formed in this way, the data area can be moved at high speed by the FF operation. For example, in the case where a writing operation to form the management information area such as the device area D1 is made to have one time speed, a running speed of, for example, about 105 times speed can be obtained as an effective value in the data area. Incidentally, although about 150 times speed can be realized as the maximum speed of the FF operation, when the effective speed is made about 70% in view of the run-up, braking, and the like, it becomes about 105 times speed.

Thus, in the case where the partition is formed by the skip formatting, a time can be greatly shortened than the case where the partition is formed by carrying out the pre-formatting.

When this is shown as an actual operation example, it takes a time of about 51 seconds to write data equivalent to, for example, 155 MB in the device area D1, about 5 seconds to write data equivalent to, for example, 16 MB in the system areas S1 and S2, and about 33 seconds to write data equivalent to, for example, 98 MB in the optional device area OD1. Thus, in order to form the management information area, it takes a time of about 94 seconds.

That is, as a time required for running in the data area, from (25 MB÷2)−155 MB−16 MB−98 MB−16 MB=12215 MB, a capacity of 12215 MB corresponds to the data area (for example, the data area of the partition #0), and as to the capacity of this data area (12215 MB), running can be made at about 105 times speed. Here, when it is assumed that a transfer speed at one time speed is made, for example, 3 MB/sec, a time becomes 12215÷(3×105)≈39 seconds. Thus, in the example shown in FIG. 14, it becomes possible to form the two partitions in a time of about 133 seconds, that is, just over 2 minutes which is obtained by adding a time of about 94 seconds required for formation of the management information to a time of 39 seconds required for the data area.

Incidentally, the numerical values shown here are an example, and it is conceivable that the speed of FF operation, the transfer speed at the one time speed, and the like become different according to the specification of the tape streamer to which the present invention is applied. However, when the case where the pre-formatting is carried out is compared with the case where the skip formatting is carried out, the degree of shortening of a time required for formation of a partition becomes almost the same.

By the way, in the case where a partition is formed to an unused magnetic tape 3 by the skip formatting, a data area becomes an unrecorded state. However, in this invention, on the basis of the management information of the recording position or reproducing position in the MIC 4, it becomes possible to discretely form the first management information area and the second management information area with the data area being interposed therebetween.

Further in the case where a partition is formed to the magnetic tape 3 which has been already used and in which some data are recorded, such a state is made that existing data (user data, etc.) remain as they are in the data area which is formed without actually writing data. Even in the case where the partition is formed in such magnetic tape 3, the tape is made to run with the FF operation based on the number of FG pulses, and reading of existing data is not carried out.

That is, after the first management information area is written, it advances with the FF operation, and writing of the second management information is carried out, so that it becomes possible to carry out formation of the partition without being influenced by the recording state of the present magnetic tape 3.

Incidentally, although the example in which the two partitions #0 and #1 are formed on the magnetic tape 3 is shown in FIG. 14, as long as the capacity of the magnetic tape 3 permits, a plurality of partitions can be further formed.

By the way, in the case where partitions are formed by the skip formatting in this way, and further, the partitions are used, as the information to be managed by the MIC 4, for example, the MIC logical format type (FIG. 10), the optional device area map, the last valid partition number, the eject status (FIG. 11), the intended max AFN (FIG. 7), and the like are made.

Among these management information, other than the intended max AFN, they are made existing information in the MIC 4, but as to the device area map, according to the contents of the MIC logical format type, it is defined as the valid partition map in this embodiment. Thus, the structure of the volume information can be made an existing structure, and as to the partition information, it is satisfactory if the intended max AFN is added.

The skip formatting is set by a mode setting command shown in FIG. 12, and the size of a partition and the like are specified by a format command shown in FIG. 13, so that it becomes possible to execute the skip formatting.

In this case, as an end position where the FF operation (skip) is carried out, that is, as a target position corresponding to a start point of a system area S2 shown in FIG. 14(e), the intended max AFN is calculated, and this intended max AFN is calculated in a manner indicated by equation (1) on the basis of a partition size (MByte) specified by the mode setting command.

[Equation 1]

$$\text{Intended Max AFN} = [(\text{size of a partition specified by mode setting}) \times \text{margin}]/\text{size of one frame} \quad (1)$$

However, the margin is made a value of, for example, about "1.02" with consideration of an overhead portion of a logical format and the rate of occurrence of frames which can not be used because of errors.

The FF operation (skip) is carried out with the objective position of the intended max AFN calculated through this equation (1), so that it becomes possible to quickly move to the position which is made the start point of the system area S2.

Incidentally, although the intended max AFN in this case is made to correspond to the end position of the data area in the partition, it becomes the position almost equal to the end position of the data area in the case where the pre-formatting is carried out with the same partition size. That is, to the same position of the magnetic tape 3, instead of, for example, movement with writing of dummy data, movement is made by merely carrying out a skip, so that a time required for formation of the partition can be shortened.

When the value of the intended max AFN is calculated, it is calculated that how many reel FG pulses correspond to the value (the number of frames).

Figure 15:
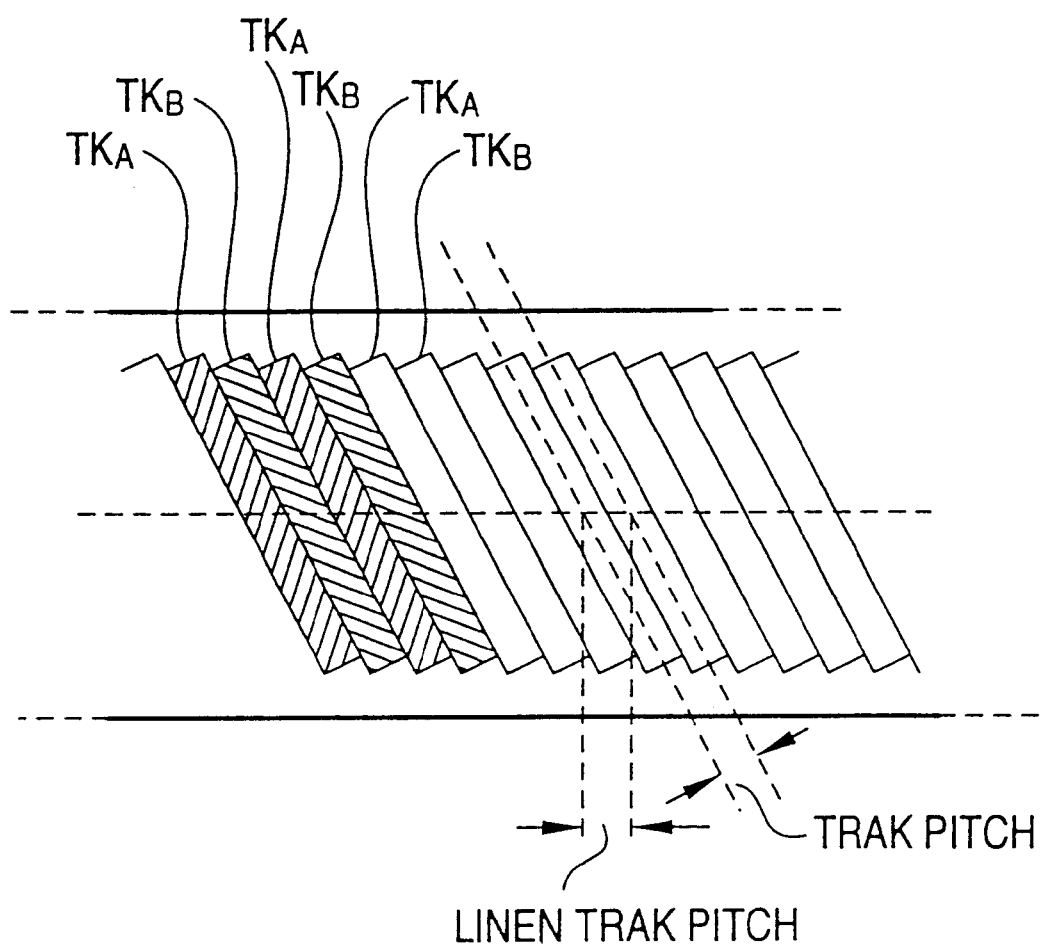
FIG. 15 is a view for explaining a linear track pitch.

First, in the magnetic tape 3, although the distance from the present position to the frame specified by the intended max AFN is obtained, in the case where this distance is made "1", it becomes that 1=intended max AFN×{(linear track pitch)×2}. However, in this equation, as shown in FIG. 15, since such a format is assumed that one frame corresponds to two tracks (plus azimuth track TKA, minus azimuth track TKB), calculation is made while a linear track pitch is made twice.

In the case where the thickness of the magnetic tape 3 is made t, the diameter of the reel hub (2A, 2B) is made $\phi$, and the number of revolutions of the reel hub (2A, 2B) is made n, the distance 1 can be obtained through a relational expression of equation (2) indicated in the following. However, information as to the thickness t of the magnetic tape 3 can be obtained from the raw format ID (FIG. 9) in the manufacture part of the MIC header.

[Equation 2]

$$1 = [\pi\{(\phi/2)+nt)\}^2 - \pi(\phi/2)^2]/t \quad (2)$$

Incidentally, in this equation (2), the first member of the numerator indicated at the right side corresponds to either one of the reel hubs 2A and 2B, and the second member of the same corresponds to the other of the reel hubs 2A and 2B, and the areas of the magnetic tape 3 wound around the respective reel hubs are indicated by them.

By such equation (2), it is possible to obtain how many times the reel hub is rotated to reach the frame specified by the intended max AFN. Thus, the FF operation is carried out until the number of FG pulses of the reel motor 30 outputted from the presently detected reel FG 31 reaches a number corresponding to the number of revolutions n of the reel hub obtainable by the equation (2), so that it becomes possible to advance the magnetic tape 3 to the objective position.

Incidentally, actually, each time the reel hub rotates by one revolution, a plurality of FG pulses are outputted from the reel FG 31, so that the accuracy of rotation detection can be improved in accordance with the number of FG pulses.

Figure 16:
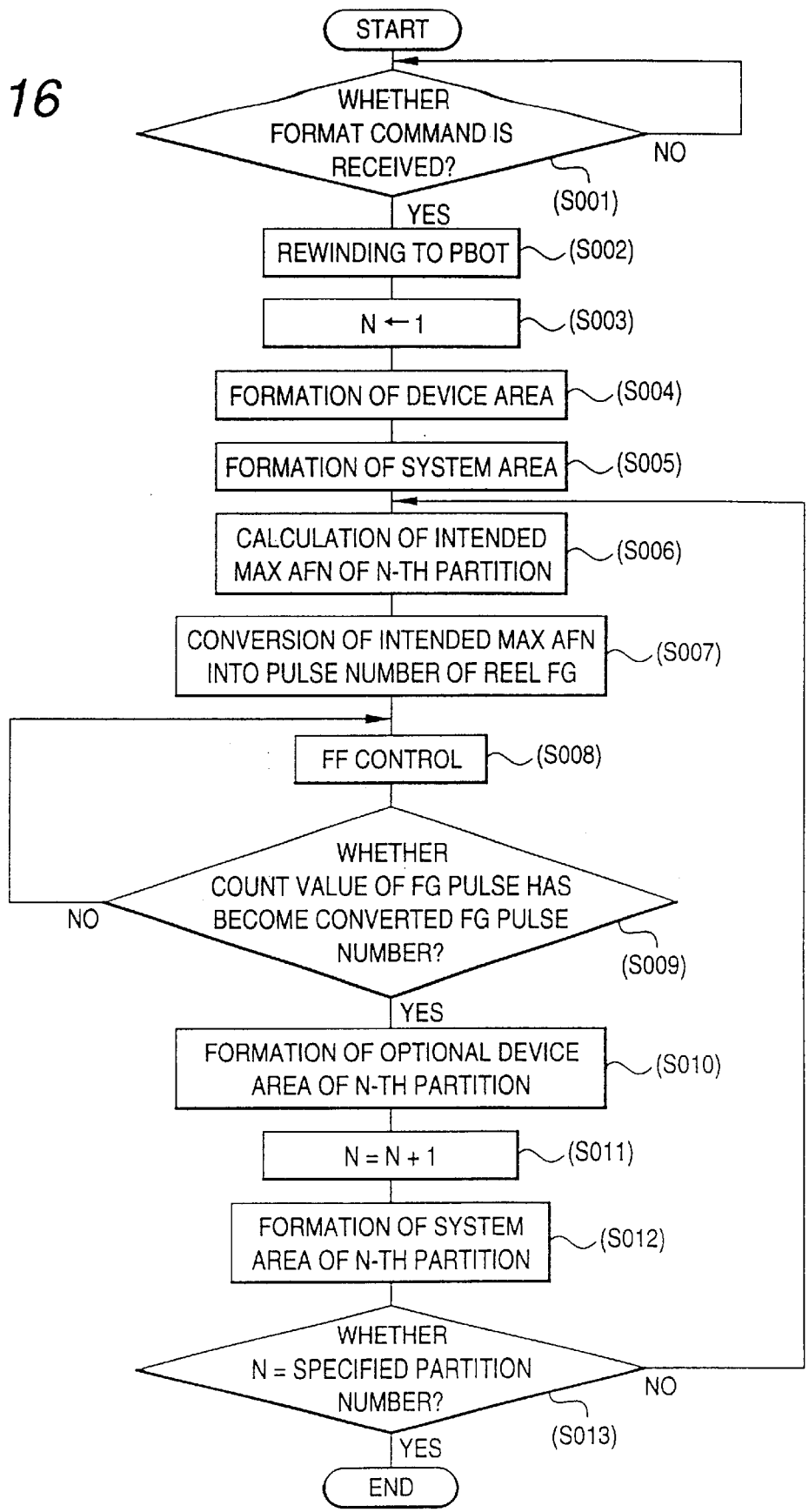
FIG. 16 is a flowchart for explaining the transition of the skip formatting of the embodiment.

FIG. 16 is a view for explaining the transition shown in FIG. 14 by means of the flowchart.

When a format command is supplied from the host computer 25 to the tape streamer (S001), the magnetic tape 3 is rewound to the PBOT to form partitions (S002). Initializing ("1") of a variable N for counting the number of formed partitions is carried out (S003), and a device area is formed (S004). Then a system area is further produced (S005). The device area and the system area formed at steps S004 and S005 correspond to the device area D1 and the system area S1 in the example shown in FIG. 14.

When the system area is produced at step S005, calculation of the intended max AFN of the N-th partition is carried out (S006), and further, after this intended max AFN is converted into the number of FG pulses of the reel FG 31 (S007), a shift to the FF operation is made and control for running the magnetic tape 3 is carried out (S008).

When the FF operation is started, judgement is made as to whether or not a count value of the FG pulses from the reel FG31 has become the necessary number of the FG pulses corresponding to the intended max AFN calculated at step S007 (S009), and the FF operation is continued until the count value becomes the necessary number of the FG pulses. At the point of time when the count value coincides with the necessary number of the FG pulses, an optional device area of the N-th partition is produced (S010). This corresponds to the optional device area OD1 in the example shown in FIG. 14(e).

By this, the N-th (first) partition is formed. Then increment of the variable N is carried out (S011), and a system area of the N-th partition is produced (S012). Here, the variable N and the number of partitions specified by the format command are compared to each other at the point of time when the system area is produced (S013), and in the case where the comparison result reveals coincidence, it is judged that all specified partitions have been formed, and the skip formatting is ended. Further, in the case where the comparison result at step S013 reveals inconsistency, it is judged that all the specified partitions have not been formed, and the process returns to step S006, and processing steps from step S006 to step S013 are repeated, so that partitions are sequentially formed.

In the case where the skip formatting is carried out in this way, for example, at the point of time when one partition (partition #0) is formed, as management information stored in the MIC 4, since an unrecorded area exists in the data area, the device area map (valid partition map) of the partition is naturally made "0", and further, the last partition number is made "0", and the eject status is made an initial value. Further, the intended max AFN is made a value calculated by adding a sufficient margin to the capacity instructed by the partition forming command as to the partition, that is, a value calculated at step S006.

Incidentally, in the case where the number of partitions specified by the format command is made, for example, 1, the partition can be formed through the processing steps from step S001 to step S005.

8. Operation at Reproducing and Recording

Figure 17:
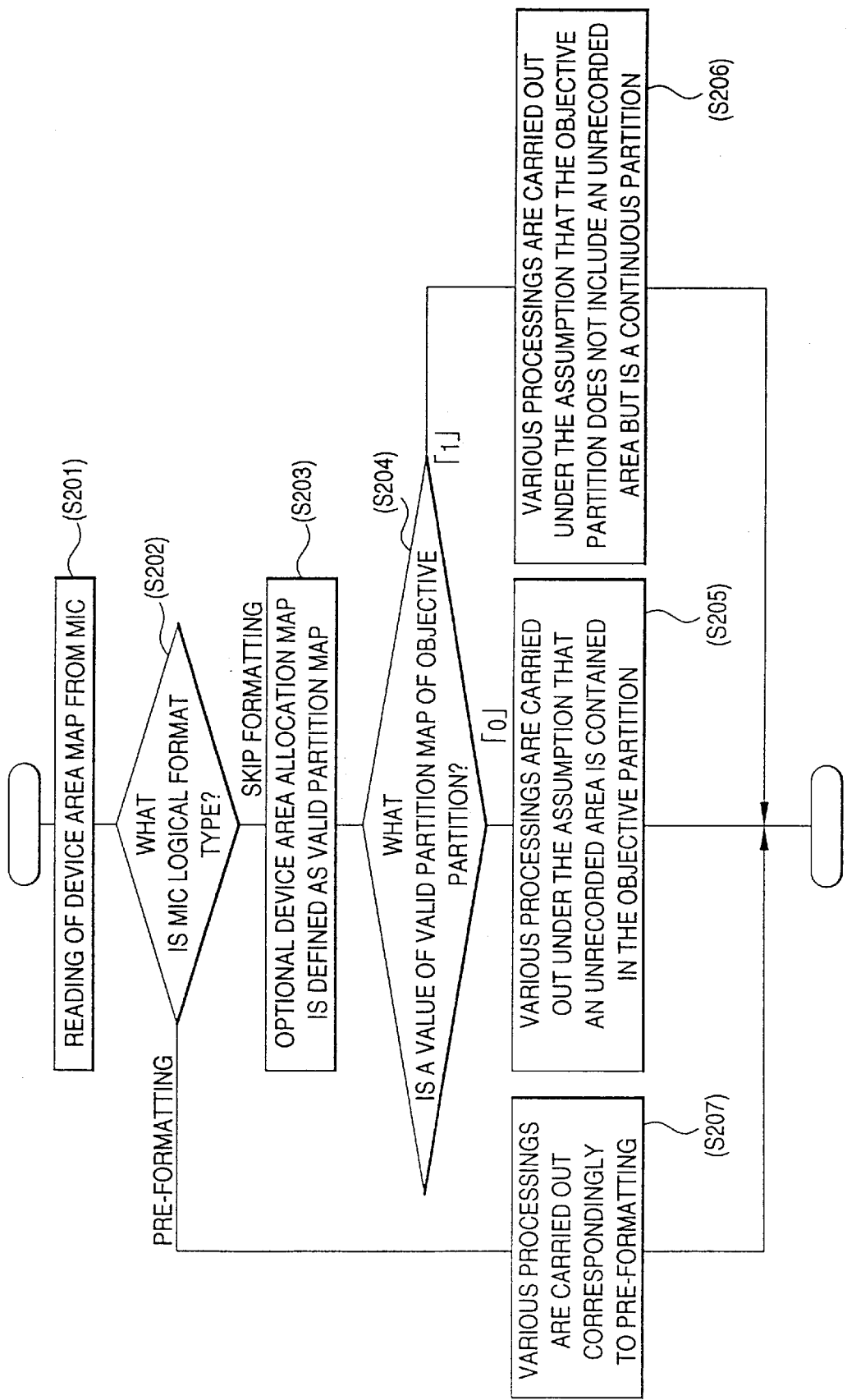
FIG. 17 is a flowchart of a tape streamer in the case where a tape cassette which has been subjected to the skip formatting is used.

Next, an example of the case where a tape cassette including the magnetic tape 3 in which partitions are formed in the manner described in FIG. 16 is loaded into the tape streamer, will be described in accordance with the flowchart shown in FIG. 17.

When the tape cassette is loaded into a tape drive apparatus, the device area map is read out from the MIC 4

(S201). Further, judgement of an MIC logical format type (pre-formatting or skip formatting) is carried out (S202). Here, in the case where it is judged that partitions are formed by the skip formatting, the optional device area location map is defined as the valid partition map (S203). Then, judgement is made as to the value of the valid partition map regarding, for example, the partition which is made an object from or to which reproducing or recording of data is carried out (S204).

Here, in the case where the value of the valid partition is made "0", it is recognized that the objective partition contains an unrecorded area, and, for example, various processings such as a search in the case where reproducing of data, addition, or the like is carried out are carried out (S205). Further, in the case where the value of the valid partition is made "1", it is recognized that the objective partition is such a partition that an unrecorded area is not contained and data are continuously recorded, and the various processings are carried out (S206).

In this case, in the case where the skip formatting is carried out to the magnetic tape 3 in which some data were once recorded by a user and which is made spent one, previously recorded data actually exists in the data area. However, when a user records data to the data area, the valid max AFN is updated with this. Thus, with respect to the data area, data before the valid max AFN are recognized as normal data, and areas subsequent to the valid max AFN are made invalid. That is, it is designed such that even if the previously recorded data exist after the valid max AFN, such data are not treated as normal data.

Thus, in the case where the value of the valid partition is "0", existence of an unrecorded area can be recognized in the data area of the partition.

In the case where recording is carried out to such an unrecorded area and the valid max AFN exceeds the intended max AFN, that is, in the case where data are recorded to all the data areas, it becomes "1".

Incidentally, in the case where it is judged that the pre-formatting is carried out by the MIC logical format type (S202), the various processings are carried out correspondingly to the pre-formatting (S207).

Figure 18:
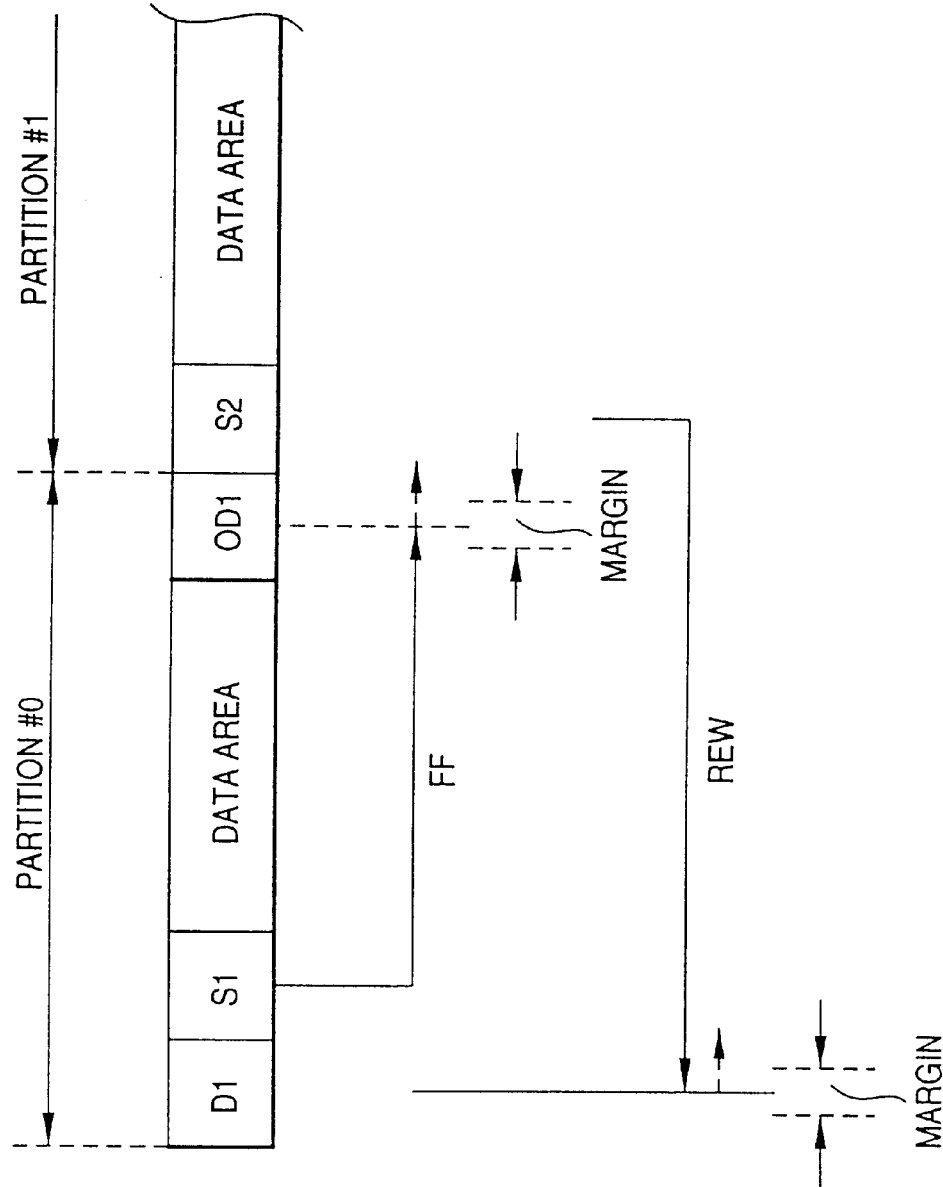
FIG. 18 is a schematic view for explaining the outline of a search operation in the case where the tape cassette which has been subjected to the skip formatting is used.

Next, in accordance with FIG. 18, a movement (search) of a reproducing position or recording position of the magnetic tape 3 in which the skip formatting is made, will be described. FIG. 18 shows that two partitions (#0, #1) are continuously formed, and an optional device area OD1 belongs to the partition #0.

In the case where the present position, that is, the position where the magnetic tape 3 is opposite to a recording head or reproducing head is made, for example, the system area S1 of the partition #0, and when it is assumed that additional recording or reproducing of data is carried out to or from the partition #1, first on the basis of the number of FG pulses of the motor from the reel FG31, it is necessary to make movement from the system area S1 to the system area S2 of the partition #1.

Between the system area S1 of the partition #0 and the optional device area OD1, that is, with respect to the data area of the partition #0, although its state, for example, whether or not an unrecorded area exists, is not definite, the optional device area OD1 and the system area S2 are formed in a seamless manner. Thus, on the basis of the FG pulses, the FF operation is carried out while the system area S1 is made a start point, and almost the center position of the area where the optional device area OD1 and the system area S2 are added is made an objective position. At this time, a margin to some degree may be provided to the objective position. When reaching the optional device area OD1, the magnetic tape 3 is made to run on the basis of, for example, necessary management information, so that it can reach the system area S2.

Incidentally, in this drawing, although the system areas S1 and S2 and the optional device areas OD1 are shown with areas equal to each other in size for convenience, actually the optional device area OD1 is made an area rather wider than the system areas S1 and S2, so that the center portion of the optional device area OD1 may be made the objective position.

Further, although the same can be said to the case where movement is made from the partition #1 to the partition #0, in this case the movement is made by the REW (rewinding) operation. For example, in the case where it is presently positioned at the system area S2 of the partition #1, the REW operation is made with the object of almost the center of the added portion of the device area D1 and the system area S1, and the magnetic tape 3 is made to run. Also in this case, a margin may be provided to the objective position. When it reaches the device area D1, the magnetic tape is made to run, for example, on the basis of necessary management information, so that it can reach the system area S1.

In this way, with respect to the partitions formed by the skip formatting, the search of reproducing position and recording position can be carried out by the FF operation or REW operation on the basis of the FG pulses by the rotating operation of the reel motor 30, so that a desired partition can be quickly searched.

As described above, according to the present invention, in the case where a partition is formed, with respect to a management information area formed on a magnetic tape, such as, for example, a device area, system area, and optional device area, necessary data writing is carried out, and in a portion corresponding to a data area, a running amount of the magnetic tape to a specified position is calculated, and skip formatting for merely running the magnetic tape to the specified position is realized. Thus, it is possible to omit data writing to the data area which has been carried out in pre-formatting processing, and so a partition forming time can be shortened.

Besides, in the portion corresponding to the data area, the magnetic tape is made to run at speed higher than that at which the management information area is produced, so that the partition can be formed at higher speed.

Besides, even in the case where a search of a desired partition is made when additional recording of data, reproduction, or the like is carried out to or from the magnetic tape in which partitions are formed by the skip formatting, a running amount to the position of the information management area (for example, device area) corresponding to the desired partition is calculated and movement is made, so that a high speed search can be realized.

Besides, the movement to the desired position is carried out by the FF operation or REW operation which is made a speed higher than that at the time of normal reproducing or recording, so that a higher speed search can be realized.

Further, a desired position is calculated on the basis on thickness information of a tape which a memory of each tape cassette includes, so that a tape drive apparatus can calculate an objective position correspondingly to each tape cassette. Thus, it is possible to cope with even tape cassettes with different tape thicknesses, and so it becomes possible to reach the objective position with excellent accuracy.

Moreover, identification information which can identify whether a partition formed on a magnetic tape of a recording medium is formed by the skip formatting or the pre-formatting is stored to a memory formed in the recording medium, so that it becomes possible to make the tape drive apparatus recognize the format system. By this, it becomes possible to general-purposely use for the tape drive apparatus corresponding to the skip formatting.

What is claimed is:

1. A tape drive apparatus comprising:

tape drive means for recording or reproducing information to or from a magnetic tape when a tape cassette containing the magnetic tape is loaded, wherein the tape cassette is provided with a memory;

memory drive means for storing in the memory management information to manage recording or reproducing to or from the magnetic tape, and for reading or writing the management information from or to the memory;

tape running means for running the magnetic tape;

tape running amount detecting means for detecting a length of the magnetic tape run by the tape running means;

tape running amount calculating means for calculating a tape running amount corresponding to a capacity of a data area of a partition to be formed on the magnetic tape and on tape thickness information included in the management information stored in the memory; and control means for controlling the tape drive means, memory drive means, tape running amount detecting means, tape running amount calculating means, and the tape running means, wherein when at least each of first to (n−1)-th partitions (where, "n" is the number of the partitions to be formed) are formed on the magnetic tape and after a first management information area is formed on a first position on the magnetic tape, tape running is executed by the tape running means until the tape running amount calculated by the tape running amount calculating means is detected by the tape running amount detecting means, and thereafter, a second management information area is formed on the magnetic tape so that the partition is formed, and the recording or reproducing of data is performed by moving the magnetic tape to a target partition from a present position on the magnetic tape based on identification information indicating a forming system of the partition included in the management information stored in the memory until the tape running amount calculated by the tape running amount calculating means is detected by the tape running amount detecting means, so that a recording position or a reproducing position on the magnetic tape is found.

2. The tape drive apparatus according to claim 1, wherein the control means converts the tape running amount by the tape running amount calculating means into a predetermined data unit and stores it in the memory using the memory drive means.

3. The tape drive apparatus according to claim 1, wherein the control means controls the tape running means so that the magnetic tape runs to a position corresponding to the data area at a speed higher than when the first and second information management areas are formed.

4. A tape drive apparatus comprising:

tape drive means for recording or reproducing information to or from a magnetic tape when a tape cassette containing the magnetic tape is loaded, wherein the tape cassette is provided with a memory;

memory drive means for storing in the memory management information to manage recording or reproducing to or from the magnetic tape, and for reading or writing the management information from or to the memory;

tape running means for running the magnetic tape;

tape running amount detecting means for detecting a length of the magnetic tape run by the tape running means;

tape running amount calculating means for calculating a tape running amount from a first to a second position on the magnetic tape based on tape thickness information included in the management information stored in the memory; and control means for controlling the tape drive means, the memory drive means, the tape running amount detecting means, the tape running amount calculating means, and the tape running means, wherein the recording or reproducing of data is performed by moving the magnetic tape to a target partition from a present position on the magnetic tape based on identification information indicating a forming system of the partition included in the management information stored in the memory until the tape running amount calculated by the tape running amount calculating means is detected by the tape running amount detecting means, so that a recording position or a reproducing position on the magnetic tape is found.

5. The tape drive apparatus according to claim 4, wherein the control means controls the tape running means so that the magnetic tape runs at a speed higher than a speed at which a normal recording or reproducing operation is carried out.

* * * * *